United States Patent [19]

Mudge et al.

[11] Patent Number: 5,239,008

[45] Date of Patent: Aug. 24, 1993

[54] GRAFT POLYMERIZATION PROCESS USING MICROFLUIDIZATION IN AN AQUEOUS EMULSION SYSTEM

[75] Inventors: Paul R. Mudge, Belle Mead; Sirisoma Wanigatunga, Bridgewater, both of N.J.

[73] Assignee: National Starch and Chemical Investment Holding Corporation, Wilmington, Del.

[21] Appl. No.: 722,997

[22] Filed: Jun. 28, 1991

[51] Int. Cl.$^5$ .................... C08F 265/02; C08F 267/02
[52] U.S. Cl. .................................. 525/243; 525/301; 525/302; 525/311
[58] Field of Search ................. 525/243, 301, 302, 311

[56] References Cited

U.S. PATENT DOCUMENTS

| | | | |
|---|---|---|---|
| 3,004,958 | 10/1961 | Bereus | 526/292.3 |
| 3,135,717 | 6/1964 | Gregorian et al. | 525/197 |
| 3,239,478 | 3/1966 | Harlan, Jr. | 428/349 |
| 3,786,116 | 1/1974 | Milkovich et al. | 525/276 |
| 3,832,423 | 8/1974 | Milkovich et al. | 525/286 |
| 3,842,059 | 10/1974 | Milkovich et al. | 525/292 |
| 3,862,267 | 1/1975 | Milkovich et al. | 525/314 |
| 4,007,311 | 2/1977 | Harlan, Jr. | 428/246 |
| 4,075,186 | 2/1978 | Ambrose et al. | 57.5/308 |
| 4,177,177 | 12/1979 | Vanderhoff et al. | 523/300 |
| 4,533,254 | 8/1985 | Cook et al. | 366/176 |
| 4,554,324 | 11/1985 | Husman et al. | 525/301 |
| 4,693,776 | 9/1987 | Krampe et al. | 156/327 |
| 4,783,389 | 11/1988 | Trout et al. | 430/137 |
| 4,783,502 | 11/1988 | Faler et al. | 524/871 |
| 4,806,609 | 2/1989 | Tracy et al. | 526/264 |
| 4,868,235 | 9/1989 | Muehlbach et al. | 524/252 |
| 4,873,289 | 10/1989 | Lindner et al. | 525/293 |
| 4,956,400 | 9/1990 | Kozakiewicz et al. | 523/223 |

OTHER PUBLICATIONS

Bulletin: "Microfluidizer ® Processing Equipment," Microfluidics Corporation, 1986, #85123135.
"Handbook of Microfluidizer Applications," Aug., 1988, Microfluidics Corporation.
*Low and High Pressure Processing, Recent Advances: The Role of the Microfluidizer* ®, Microfluidics Corporation, Newton, Mass.
Abstract: Int. J. Pharm., 44(1–3), 169–76; The Production of Parenteral Feeding Emulsions by The Microfluidizer.
Chemical Abstracts, vol. 113, No. 14, Oct. 1, 1990; Columbus, Ohio, U.S.A.; T. Azuma, et al., "manufacture of aqueous resins.", pp. 44–45.

Primary Examiner—John Kight, III
Assistant Examiner—T. Mosley
Attorney, Agent, or Firm—Ellen T. Dec; Edwin M. Szala

[57] ABSTRACT

A process for the emulsion polymerization of graft copolymers comprising the steps of: a) obtaining an unsaturated polymer containing terminal or pendant polymerizable functionalities; b) dissolving the resultant unsaturated polymer in an ethylenically unsaturated monomer in the presence of a surfactant in water to form an aqueous phase; c) microfluidizing the aqueous phase of (b) to a size of less than 0.5 u; and d) subsequently graft polymerizing a monomer with the unsaturated polymer in the microfluidized aqueous phase using free radical polymerization techniques; such that the graft polymerization reaction occurs within each micelle thereby resulting in uniform particles of the predetermined particle size.

12 Claims, No Drawings

GRAFT POLYMERIZATION PROCESS USING MICROFLUIDIZATION IN AN AQUEOUS EMULSION SYSTEM

Graft copolymers have become increasingly important for a wide variety of industrial applications. These graft copolymers are prepared when at least two joined together chemically to give a sort of forced compatibility. In such a copolymer, each polymer segment continues to manifest its independent polymer properties. Thus, the block or graft copolymer can be prepared so as to possess a combination of properties not normally found in a homopolymer or a random copolymer.

Processes for the production of graft copolymers generally involve bulk polymerization or solution polymerization techniques wherein a prepolymer is dissolved in an inert solvent of the monomer and a polymerization catalyst and then polymerized. A representative method is described in U.S. Pat. No. 3,235,626. Other methods are disclosed in U.S. Pat. Nos. 3,832,423, 3,862,267, 3,842,059, 4,007,311 and the like.

Attempts to prepare such graft polymers (also known as comb polymers) in an aqueous emulsion polymerization system have been unsuccessful due to the tendency of the monomers in which the prepolymer is dissolved to transport from the emulsion micelles into the growing particles leaving behind the unsaturated prepolymeric species which thus do not enter into the polymerization and therefore result in a dispersion of two distinct polymers.

In accordance with the present invention, we have found that graft copolymers may be prepared in water and in predetermined uniform particle sizes by use of microfluidization.

More specifically, graft copolymers of the present invention are prepared by first synthesizing an unsaturated polymer containing terminal or pendant polymerizable functionalities and subsequently graft polymerizing the second monomer with the unsaturated polymer in an emulsion using microfluidization techniques. Thus, when the unsaturated polymer dissolved in the vinyl monomer is combined with a surfactant in water and then microfluidized, the resulting particles are so small as to effectively be the center of polymerization so that the graft polymerization reaction occurs within each micelle resulting in uniform particles of predetermined particle size.

Unsaturated polymers containing terminal polymerizable functionality are generally referred to as macromers or living polymers. Representative of such macromers are those described in U.S. Pat. No. 3,862,267, the pertinent disclosures of which are incorporated herein by reference. An example of such macromers are polystyrene methacrylates such as Chemlink 4500® (molecular weight 13,000) and Chemlink 4545® (molecular weight 4,000) marketed by Arco Chemical; and 13k-Rc Macromer monomer (molecular weight 14,800) marketed by Sartomer.

Alternatively, polymers containing the unsaturated polymerizable functionality at locations other than the terminal position may also be utilized in preparing the graft copolymers of the invention. Such unsaturated polymers are either linear or branched in structure and have at least two terminal polymer blocks of a monoalkenylarene such as styrene or alphamethylstyrene and at least one polymer block of a conjugated diene such as butadiene or isoprene, as well as hydrogenated derivatives of the same. The alkenyl arene polymer blocks normally have average molecular weights between about 4,000 and 50,000, preferably between 14,000 and 25,000. The conjugated diene polymer blocks or their substantially completely hydrogenated counterparts have average molecular weights between about 30,000 and 200,000, preferably between 40,000 and 125,000. Two typical species are polystyrene-polybutadiene-polystyrene and polystyrene-polyisoprene-polystyrene. Representative polymers as well as processes for the preparation thereof are described in U.S. Pat. No. 3,239,478. In addition to these non-hydrogenated species, certain hydrogenated species thereof may be employed. These comprise polymers in which at least the conjugated diene polymer blocks or any desired fraction thereof are hydrogenated. Selective hydrogenation may be carried out to reduce the olefinic double bonds as described in U.S. Pat. No. 3,595,942.

Either of the resulting classes of unsaturated polymers are then polymerized with an ehtylenically unsaturated monomer, preferably a vinyl type compound containing the characteristic $CH_2=CH-$ group. Examples of some of the preferred ethylenically unsaturated compounds used as the comonomers include the acrylic acids, their esters, amides and nitriles including acrylic acid, methacrylic acid, the alkyl esters of acrylic and methacrylic acid, acrylonitrile, methacrylonitrile, acrylamide, methacrylamide, N,N-dimethacrylamide (NNDMA); the vinyl halides such as vinyl chloride, and vinylidene chloride; the vinyl cyanides such as vinylidene cyanide (1,1-dicyanoethylene); the vinyl esters of $C_1$ to $C_{13}$ acids such as vinyl acetate, vinyl propionate and vinyl chloroacetate, etc; and the vinylidene containing dicarboxylic anhydrides, acids and esters.

A particularly important class of vinylidene type compounds useful as comonomers however include the vinyl olefinic hydrocarbons, such as ethylene, propylene, 1-butene, isobutylene, 1-pentene, 1-hexene, sytrene, 3-methyl-1-butene, 4-methyl-1-hexene and cyclohexane. Also, there may be used as the comonomers the polyolefinic materials containing at least one vinylidene group such as the butadiene-1,3 hydrocarbons including butadiene, isoprene, piperylene and other conjugated dienes, as well as other conjugated and non-conjugated polyolefinic monomers including divinyl benzene, the diacrylate type esters of methylene, ethylene, polyethylene glycols and polyallyl sucrose.

The most preferred ethylenically unsaturated comonomers are the commercially available and widely used monomers such as methyl acrylate, butyl acrylate, 2-ethyl hexyl acrylate, methyl methacrylate, vinyl chloride, vinylidene chloride, vinylidene cyanide, acrylonitrile; and the hydrocarbon monomers such as ethylene, propylene, styrene; and the conjugated dienes such as butadiene and isoprene.

The copolymerization of the unsaturated polymers with the comonomers may be conducted in a wide range of proportions and is only dependent upon the relative reactivity ratios of the terminal or other unsaturated group and the comonomer. Generally speaking, a sufficient amount of polymer should be present to provide the chemical joining of at least one of the uniform molecular weight sidechain polymers to each backbone polymer, so that a noticeable effect on the properties of the graft copolymeric properties can be obtained. Since the molecular weight of the graft polymerizable polymer generally exceeds that of the polymerizable comonomers, a relatively small amount of the polymerizable polymer can be employed. However, the chemically joined, phase separated thermoplastic graft copolymers may be prepared by copolymerizing a mixture containing up to about 95 percent by weight, or more, of the polymerizable polymer of this invention, although mixtures containing up to about 60 percent by weight of the polymerizable polymer are preferred. Stated otherwise, the resinous thermoplastic chemically joined, phase separated graft copolymer of the invention is comprised of from 1 percent to about 95 percent by weight of the polymerizable polymer and from 99 percent to about 5 percent by weight of the copolymerizable comonomer defined hereinabove.

It is generally desirably to provide a graft copolymer having at least about 2 percent of moieties from the unsaturated polymer incorporated in the backbone polymeric material; however, satisfactory results can be obtained with up to about 40 percent by weight unsaturated polymeric moieties incorporation. Preferably, the graft copolymers of the present invention will have about 5 percent to about 20 percent by weight incorporation of these moieties into the backbone polymeric material to obtain the optimum physical properties of both the sidechain polymer and the backbone polymer. However, graft copolymers having up to about 95 percent by weight of the unsaturated moieties incorporated therein may be prepared and are contemplated within the scope of the invention.

In carrying out the process of this invention, the polymer and vinyl monomers are admixed with stirring or other agitation (e.g. "Lightning Mixer") into the described aqueous phase containing the emulsifying agent, desirably at temperatures from above room temperatures to below the boiling point of the aqueous medium (at the pressure employed normal, sub- or super-atmospheric), generally ranging from about 40° to about 90° C., preferably about 55° to about 75° C.

As indicated above, it is desirable to produce emulsions with as high a solids content as possible, and accordingly the ratio of the liquefied polymer phase to the aqueous medium phase could be as high as possible without introducing inversion possibilities, i.e., emulsification of the polymer phase in the aqueous phase. The weight ratio of the polymer phase to the aqueous phase generally will range from about 0.1:1 to about 2:1, more preferably about 0.2:1 to 1:1, most preferably about 0.5:1 to 0.9:1. In the case of graft copolymers having molecular weights greater than about 10,000 it is also desirable to utilize 10 to 30% by weight of the polymer of an organic solvent such as toluene, ethyl acetate, or methyl ethyl ketone. In these cases, the solvent is essential to insure complete incorporation of the graft copolymer onto the main chain.

The resulting crude emulsion of coarse polymer phase droplets is then subjected, at temperatures similar to those specified for the initial emulsification, to the action of comminuting forces sufficient to enable the production of an aqueous microfluidized emulsion containing polymer particles averaging less than about 0.5 u, desirably less than about 0.3 u to about 0.1 u or lower. Means for applying such comminuting forces are well known in the art and are a matter of judicious selection in carrying out the present process. Such forces may be of any type, e.g., shear, attrition, impact, explosion, implosion, or any combination thereof. A number of types of devices for subjecting the crude emulsion to these comminuting forces are commercially available, including the Microfluidics and Manton-Gaulin microfluidizers, i.e., the Manton-Gaulin Model 15M-8TA Laboratory Homogenizer and Submicron Disperser (Mainton-Gaulin Co.). the crude emulsion is forced through a small orifice at pressures up to about 16,000 psi. In the case of the Manton-Gaulin Homogenizer, the rapid increase in velocity between the valve stem and seat causes cavitation of the liquid and the formation of bubbles; the collapse of these bubbles sets the valve stem into vibration at high frequencies (20–50 kilocycles/sec.), which breaks the emulsion droplets to a smaller size. The homogenized emulsion can be recycles through the orifice by use of a three-way valve in the device to direct it back to the supply tank. When the Microfluidics Microfluidizer M-110 is used, the feed stream is pumped into a specially designed chamber in which fluid sheets interact at ultrahigh velocities and pressures up to 1500 ft/second and 16,000 psi, respectively. The fixed microchannels within the chamber provide an extremely focused interaction zone of intense turbulence causing the release of energy amid cavitation and shear forces.

The above described crude emulsion is passed or recycles through such microfluidizer comminuting device a sufficient number of times, usually two, three or more times, until an emulsion is obtained containing the desired small size polymer phase particles.

The resulting microfluidized emulsion is then interpolymerized using conventional emulsion polymerization procedures in an aqueous medium using a free-radical catalyst, and a surfactant, the aqueous system being maintained by a suitable buffering agent, if necessary, at temperatures of about 70° to 225° F., preferably from 120° to 175° F., for sufficient time to achieve a low monomer content, e.g., from 0.5 to about 10 hours, preferably from 2 to about 6 hours, to produce a latex having less than 1.5 percent preferably less than 0.5 weight percent free monomer.

Conventional batch, semi-batch or continuous emulsion polymerization procedures may be utilized herein. Generally, the monomers are polymerized in an aqueous medium under pressures not exceeding 100 atmospheres in the presence of a catalyst and at least one surfactant or other emulsifying agent.

In the case of vinyl ester interpolymers containing ethylene, the polymerization procedure is similar to that discussed above except that it is carried out under pressure of 10 to about 130 atmospheres using polymerization procedures taught, for example, in U.S. Pat. Nos. 3,708,388; 3,404,112; 3,714,099 and 4,164,488. In these cases, the ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally, the polymerization is performed at temperatures from 120° to 175° F. and, at these temperatures, ethylene partial pressures from 50 to 1,500, preferably from 250 to 1,000 psig, are sufficient to incorporate from 1 to 30, preferably from 5 to 25, weight percent ethylene in the polymer. Preferably, the ethylene partial pressure is maintained constant throughout the polymerization period so that this monomer is continuously supplied at a constant rate.

The polymerization is typically initiated by a free radical initiator such as water soluble peracid or salt thereof, e.g., hydrogen peroxide, peracetic acid, persulfuric acid or the ammonium and alkali metal salts thereof, e.g., ammonium persulfate, sodium peracetate, lithium persulfate, potassium persulfate, sodium persulfate, etc. Alternatively, organic peroxides such as benzoyl peroxide, t-butyl hydroperoxide, etc., may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxylate, potassium metabisulfite, sodium pyrosulfite, etc. The amount of reducing agent can be employed throughout the copolymerization generally varies from about 0.1 to 3 weight percent of the amount of polymer.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or nonionic surface active compounds. Suitable anionic emulsifiers are, for example, alkyl sulfonates, alkyaryl sulfonates, alkyl sulfates of hydroxylalkanols, alkyl and alkylaryl disulfonates, sulfonated fatty acids, sulfates and phosphates of polyethoxylated alkanols and alkyphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanois with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual monomer content is below about 1%. The completed reaction product is then allowed to cool to about room temperature while sealed from the atmosphere.

The emulsions are produced and used at relatively high solids contents, e.g., between 35 to 70%, preferably not less than 50%, although they may be diluted with water if desired.

EXAMPLE 1

This example describes the preparation of a graft copolymer using conventional batch polymerization in accordance with the microfluidization procedure of the present invention. All parts are by weight.

| A | 2-Ethylhexyl acrylate | 480 |
|---|---|---|
|   | Styrene | 60 |
|   | Methacryloxy terminated Polystyrene Macromer (MW-4000) | 60 |
| B | Water | 600 |
|   | Triton X-405, alkyl aryl polyether alcohol (40 ethylene oxide) available from Rohm and Haas | 48 |
|   | Abex 26S, an anionic surfactant from Alcolac | 36 |
| C | Tertiary butyl hydroperoxide (70% in water) | 6 |
|   | Water | 80 |
| D | Sodium formaldehyde sulfoxylate | 6 |
|   | Water | 80 |

The monomer mixture, "A", was emulsified into the surfactant solution, "B", using a bladed stirrer. The resulting pre-emulsion was microfluidized twice using the M-110 series laboratory microfluidizer (Microfluidics Corporation). The microfluidized pre-emulsion was then added to a two-liter flask to which a condenser, stirrer, $N_2$ inlet, thermometer and the initiator inlets were connected. The $N_2$ inlet, thermometer and the initiator inlets were connected. The $N_2$ purge was started, and the contents were heated to 75° C. The initiators, "C" and "D" were added over three hours. The contents were cooled after reaction was completed.

The resulting emulsion had the following properties: solids 44.4%, intrinsic viscosity [I.V. in tetrahydrofuran] 1.63, RVF Brookfield Viscosity 90, Grit 0.019%.

EXAMPLE 2

This example describe the preparation of a typical emulsion containing monomer-macromer graft copolymers using a seeded or a semi-batch polymerization in accordance with the present invention.

| Initial charge | Water | 100 |
|---|---|---|
| A | Butyl Acrylate | 75 |
|   | Methacryloxy Terminated Polystyrene Macromere (MW = 14,800) | 45 |
|   | Toluene | 25 |
| B | Water | 175 |
|   | Triton X-405 | 18 |
|   | Abex 26S | 12 |
|   | % $FESO_4$ | 0.5 |
| E | Butyl Acrylate | 180 |
|   | Water | 100 |
|   | Triton X-405 | 6 |

|   |                                     |    |
|---|-------------------------------------|----|
| C | Abex 26S                            | 6  |
|   | Tertiary butyl hydroperoxide (70% in Water) | 2 |
|   | Water                               | 20 |
| D | Sodium formaldehyde sulfoxylate     | 1  |
|   | Water                               | 20 |

The monomer mixture, "A", was emulsified into the surfactant solution, "B", using a bladed stirrer. The resulting pre-emulsion was microfluidized twice using the M-110 series laboratory microfluidizer (Microfluidics Corporation). The initial charge was added to a two liter flask to which a condenser, stirrer, $N_2$ inlet, thermometer and the inlets for the initiators were connected. The $N_2$ purge was started, the microfluidized pre-emulsion added into the initial charge and the contents were heated to 80° C. The initiators, C and D and monomer pre-emulsion, "E", (not microfluidized) were added over three hours. The temperature was then raised to 90° C., and after 0.75 hours, the post adds, "C" and "D" were added over 10 minutes. Toluene was then removed by steam distillation.

The resulting emulsion had the following properties: solids 37.7%, intrinsic viscosity [in tetrahydrofuran] 1.663, RVF Brookfield 25, and Grit 0.003%.

EXAMPLES 3–7

The method of preparation of the graft copolymers were basically the same as in Example 2, except that the high molecular weight polymer macromer and monomers were varied. In Examples 3 to 6, a solvent such as toluene was not used. In Example 7, ethyl acetate was used as the solvent. The components, relative amounts and physical properties are shown below.

|    |                                              | 8   | 9   |
|----|----------------------------------------------|-----|-----|
| IC | Sodium formaldehyde sulfoxylate              | 1   | 1   |
|    | Water                                        | 150 | 150 |
| A  | 2 Ethyl hexyl acrylate                       | 240 | 240 |
|    | Styrene                                      | 30  | 30  |
|    | Methacryloxy terminated Polystyrene Macromer (MW = 13,000) | 30 | 30 |
| B  | Water                                        | 300 | 300 |
|    | Triton X405                                  | 24  | 24  |
|    | Abex 26S                                     | 18  | 18  |
| C  | Water                                        | 25  | 25  |
|    | Sodium formaldehyde sulfoxylate              | 1   | 1   |

The monomer mixture, "A", containing macromer was emulsified into the surfactant solution "B" using a bladed stirrer. The resulting pre-emulsion from experiment A was microfluidized using the M-110 Series laboratory microfluidizer (Microfluidics Corporation). The other pre-emulsion was not microfluidized. The initial charge (IC) was added to a two liter flask to which a condenser, stirrer, $N_2$ inlet, thermometer and the inlets for the initiators were connected. The $N_2$ purge was started and the contents were heated to 80°–82° C. Then the initiator solution, "C", and the pre-emulsion was slow added over four hours. The post add, sodium formaldehyde sulfoxylate/water (0.5/10) was then added followed by another post add, tertiary butyl hydroperoxide/sodium formaldehyde sulfoxylate/water (1/1/10). The contents were cooled.

The emulsion from Experiment 8 had 38.8% solids, intrinsic viscosity in the 0.462, RVF Brookfield 17 and grit 0.011. Reaction 9 coagulated quickly with macromer build up on the vessel. The resulting emulsion

| Example Number | Monomer | Macromer/Polymer | Ratio | Solids % | Intrinsic Viscosity IV(THF) | RVF Viscosity (eps) (Brookfield) | Grit % |
|---|---|---|---|---|---|---|---|
| 3 | Butyl Acrylate | Hydroxy terminated Polybutadiene (MW = 2800) | 84/26 | 39.0 | 0.442 | 18.5 | 0.004 |
| 4 | Butyl Acrylate/Styrene | Polyisoprene (MW = 29,000) | 42.5/42.5/15 | 47.3 | 0.677 | 1064.0 | 0.005 |
| 5 | Butyl Acrylate/Styrene | Polyisoprene (MW = 47,000) | 42.5/42.5/15 | 47.5 | 0.640 | 674.0 | 0.026 |
| 6 | 2 Ethylhexyl Acrylate/Styrene | Polyisoprene (MW = 29,000) | 67.8/16.9/15.3 | 46.2 | 0.866 | 570.0 | 0.036 |
| 7 | Styrene/Chloromethyl Styrene/Acrylic Acid | Polyisoprene (MW = 47,000) | 16/60/4/20 | 42.5 | 0.413 | 22.5 | 0.085 |

EXAMPLES 8 AND 9

These examples illustrate that microfluidization is necessary for graft polymer formation in emulsion. Without microfluidization, the reaction coagulates quickly with macromer building up on the reaction vessel. With microfluidization, the reaction goes fairly smoothly, with only little build up on reaction vessel.

had solids 36.4%, intrinsic viscosity 0.949, RVF Brookfield 17 and 0.007% grit.

What is claimed:

1. A process for the emulsion polymerization of graft copolymers consisting essentially of the steps of:
    a) obtaining an unsaturated polymer containing terminal or pendant polymerizable functionalities;

b) dissolving the resultant unsaturated polymer in an ethylenically unsaturated monomer in the presence of a surfactant in water to form an aqueous phase;

c) microfluidizing the aqueous phase of (b) to a size of less than 0.5 u; and d) subsequently graft polymerizing a monomer with the unsaturated polymer in the microfluidized aqueous phase using free radical polymerization techniques;

such that the graft polymerization reaction occurs within each micelle thereby resulting in uniform particles of the predetermined particle size.

2. The process of claim 1 wherein the unsaturated polymer containing terminal polymerizable functionality is a polystyrene methacrylate.

3. The process of claim 1 wherein the unsaturated polymer containing terminal polymerizable functionality is linear or branched in structure and has at least two terminal polymer blocks of a monoalkenylarene and at least one polymer block of a conjugated diene.

4. The process of claim 1 wherein the ethylenically unsaturated monomer is selected from the group consisting of acrylic acid, its esters, amides and nitriles; vinyl halides; vinyl cyanides; vinyl esters of $C_1$ to $c_{13}$ acids and vinylidene containing dicarboxylic anhydrides, acids and esters thereof.

5. The process of claim 4 wherein the ethylenically unsaturated monomer is vinyl acetate.

6. The process of claim 1 wherein the ethylenically unsaturated monomer is a vinyl olefinic hydrocarbon selected from the group consisting of ethylene, propylene, 1-butene, isobutylene, 1-pentene, 1-hexene, styrene, 3-methyl-1-butane, 4-methyl-1-hexene and cyclohexane.

7. The process of claim 1 wherein the ethylenically unsaturated monomer is selected from the group consisting of methyl acrylate, ethyl acrylate, butyl acrylate, 2-ethyl hexyl acrylate, methyl methacrylate, vinyl chloride, vinylidene chloride, vinylidene cyanide, acrylonitrile, ethylene, propylene, styrene, butadiene and isoprene.

8. The process of claim 1 wherein the graft copolymer comprises 1 percent to about 95 percent by weight of the polymerizable unsaturated polymer and from 99 percent to about 5 percent by weight of the copolymerizable comonomer.

9. The process of claim 1 wherein weight ratio of the polymer phase to the aqueous phase ranges from 0.1:1 to 2:1.

10. The process of claim 1 wherein weight ratio of the polymer phase to the aqueous phase ranges from 0.5 to 0.9.

11. The process of claim 1 wherein there is also present in the polymer emulsion 10 to 30% by weight of the polymer of an organic solvent.

12. A graft copolymer made by the process of claim 1.

* * * * *